US008622824B2

(12) United States Patent
Vlazny

(10) Patent No.: US 8,622,824 B2
(45) Date of Patent: Jan. 7, 2014

(54) METHOD AND SYSTEM FOR VIEWING IMAGES OF A PARI-MUTUEL GAMING ACTIVITY

(75) Inventor: Kenneth A. Vlazny, York, PA (US)

(73) Assignee: United Tote Company, Louisville, KY (US)

( * ) Notice: Subject to any disclaimer, the term of this patent is extended or adjusted under 35 U.S.C. 154(b) by 2064 days.

(21) Appl. No.: 10/923,193

(22) Filed: Aug. 19, 2004

(65) Prior Publication Data

US 2005/0124409 A1 Jun. 9, 2005

Related U.S. Application Data

(60) Provisional application No. 60/528,032, filed on Dec. 8, 2003.

(51) Int. Cl.

| | |
|---|---|
| ***A63F 9/00*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .................................................... 463/30

(58) Field of Classification Search
USPC .................................................... 463/28, 34
See application file for complete search history.

(56) References Cited

U.S. PATENT DOCUMENTS

| | | | | |
|---|---|---|---|---|
| 4,774,582 | A * | 9/1988 | Hakamada et al. | 348/565 |
| 4,821,029 | A * | 4/1989 | Logan et al. | 345/173 |
| 4,914,624 | A * | 4/1990 | Dunthorn | 345/173 |
| 5,564,977 | A | 10/1996 | Algie | |
| 6,172,672 | B1 * | 1/2001 | Ramasubramanian et al. | 715/720 |
| 6,307,550 | B1 * | 10/2001 | Chen et al. | 345/418 |
| 6,358,150 | B1 | 3/2002 | Mir et al. | |
| 6,674,448 | B1 * | 1/2004 | Marshall et al. | 715/719 |
| 6,883,140 | B1 * | 4/2005 | Acker et al. | 715/730 |
| 2002/0049975 | A1 * | 4/2002 | Thomas et al. | 725/60 |
| 2002/0161794 | A1 * | 10/2002 | Dutta et al. | 707/500 |
| 2004/0254006 | A1 * | 12/2004 | Lam et al. | 463/16 |

OTHER PUBLICATIONS

Pogue, David. "Windows XP home edition: the missing manual." Pogue press, LLC, 2002.*
Windows XP Fast and Easy, Copyright 2002.*

* cited by examiner

*Primary Examiner* — David L Lewis
*Assistant Examiner* — Reginald Renwick
(74) *Attorney, Agent, or Firm* — TraskBritt

(57) ABSTRACT

The invention relates generally to the field of gaming and, more particularly, to pari-mutuel gaming activities and pari-mutuel gaming systems. In one embodiment, a method of conducting a pari-mutuel gaming activity includes providing a patron an opportunity to view an event that is a subject of the pari-mutuel gaming activity and providing the patron an opportunity to select an image of the event in progress. Responsive to the patron selecting the image, the image is saved and the patron is provided with an opportunity to view the saved imaged subsequent to saving. A system and computer for providing the method of conducting the pari-mutuel gaming activity is also disclosed. In the pari-mutuel gaming activities described herein, a patron is enabled to create multiple "snapshots" of a race.

34 Claims, 3 Drawing Sheets

METHOD AND SYSTEM FOR VIEWING IMAGES OF A PARI-MUTUEL GAMING ACTIVITY

CROSS-REFERENCE TO RELATED APPLICATION

This application claims the benefit of U.S. Provisional Application 60/528,032 filed Dec. 8, 2003, the contents of the entirety of which are incorporated by this reference.

BACKGROUND OF THE INVENTION

1. Field of the Invention

The invention relates generally to the field of gaming and, more particularly, to pari-mutuel betting methods and pari-mutuel gaming systems.

2. State of the Art

At gaming establishments that offer wagering on live events such as horse, bicycle, auto and dog races, patrons generally view the races on personal television monitors, shared monitors and large screen televisions. While the patrons may have the ability to select a channel for viewing, the patron's viewing experience is controlled by the production company supplying the audio and video. As a consequence, the patron's watching of the event is purely passive.

Some patrons watch video of live races via a computer connected to the Internet or other network. In these "broadcasts," the patron has the ability to "freeze" an image of the live race or a race replay, but can only choose to "unfreeze" the image and resume watching the video of the race which may result in the patron missing part of the race.

BRIEF SUMMARY OF THE INVENTION

In the pari-mutuel gaming activities described herein, a patron is able to create multiple "snapshots" of an event. In one embodiment, a method of conducting a pari-mutuel gaming activity includes providing a patron an opportunity to view an event that is the subject of pari-mutuel gaming activity and providing the patron an opportunity to select at least one image of the event in progress. Responsive to the patron selecting the at least one image, the at least one image is saved. The patron is also provided with an opportunity to view the at least one image subsequent to saving.

In another embodiment, a method of conducting a pari-mutuel gaming activity includes providing a patron an opportunity to view an event that is the subject of a pari-mutuel gaming activity on a display element associated with a pari-mutuel gaming system. The method further includes providing the patron an opportunity to select at least one image of an event while in progress with an input device and, responsive to the patron selecting the at least one image, saving the at least one image for subsequent viewing.

In an additional embodiment, a system for conducting a pari-mutuel gaming activity comprises a display element for displaying information associated with an event that is the subject of a pari-mutuel gaming activity. The system further includes an input device for interacting with a patron and a computer operatively configured with software. The software is operatively configured to enable the computer to conduct the pari-mutuel gaming activity. During the pari-mutuel gaming activity, the display element is enabled to display the event in progress and the patron is provided with an opportunity to select at least one image of the event in progress with the input device. If the patron selects the at least one image, the at least one image is saved in memory. The patron is further provided with an opportunity to subsequently view the at least one saved image.

In a further embodiment, a computer configured to conduct a pari-mutuel gaming activity includes a central processing unit and an input device. Memory of the computer is configured with software that is operatively configured to generate information associated with an event that is a subject of the pari-mutuel gaming activity and display the information associated with the event of the pari-mutuel gaming activity on a display element. The software is also configured to store at least one image of the event in memory for subsequent viewing in response to the patron activating the input device.

As used herein, the term "event in progress" encompasses not only live broadcasts of races and other sporting events, but also delayed broadcasts. Thus, a patron is enabled to select and save one or more frames or images of an event as he or she is viewing the progress thereof, and not necessarily as the event is progressing in real time.

DETAILED DESCRIPTION OF THE INVENTION

Figure 1:
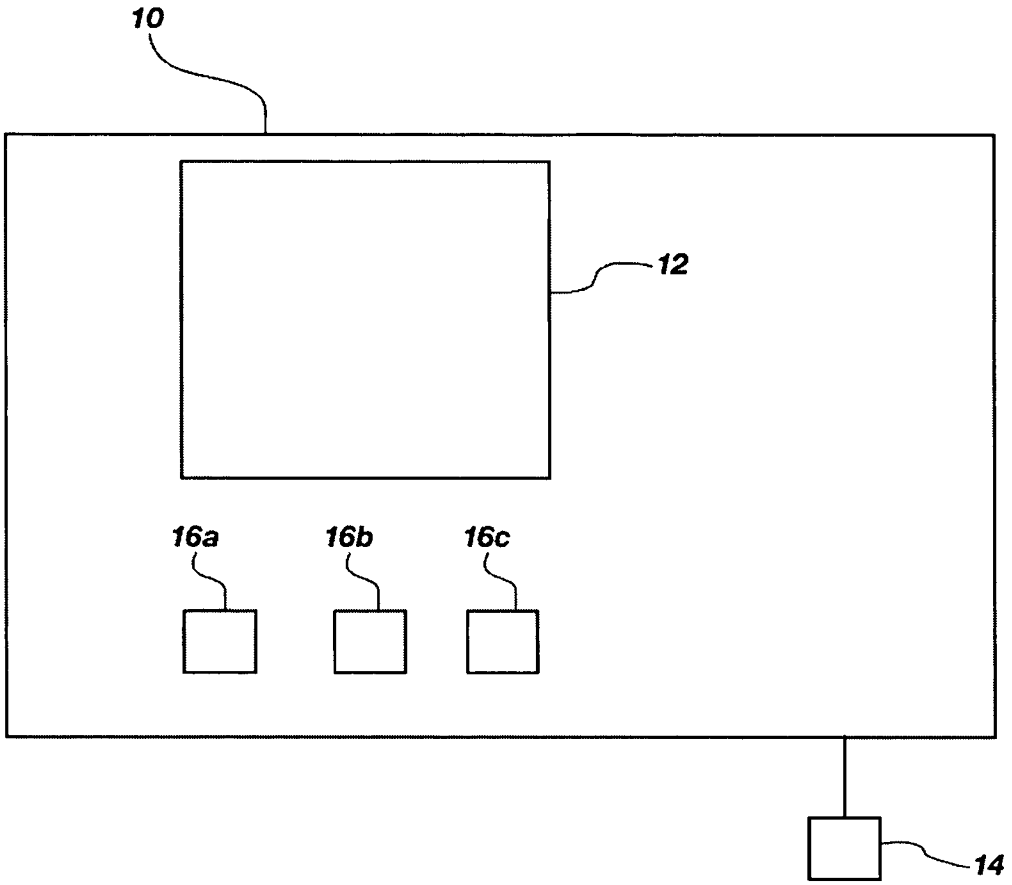
FIG. 1 is a schematic diagram of one embodiment of a display element used to view a pari-mutuel gaming activity of the present invention.

Generally, the present invention comprises new and enhanced methods of conducting pari-mutuel gaming activities, pari-mutuel gaming systems, computer-based gaming terminals, and computers configured for play of the pari-mutuel gaming activities. While the present invention is described in terms of certain exemplary embodiments, the specific details of these exemplary embodiments are set forth in order to provide a thorough understanding of the present invention. It will be apparent, however, that the present invention may be practiced in the form of various combinations or modifications of the exemplary embodiments presented herein.

The exemplary embodiments described herein may be implemented on pari-mutuel gaming systems including on-line wagering systems and betting, or wager, terminals located at pari-mutuel gaming establishments including, but not limited to, thoroughbred horse tracks, harnessed horse tracks, car tracks, greyhound racetracks, jai-alai frontons, and off-track betting facilities. Pari-mutuel wagering systems may also be referred to as "tote systems" and conventionally include wagering terminals, a computer server having computers and various peripheral devices, software configured to conduct the pari-mutuel gaming activities, tote boards, and other display elements and video generation equipment. The pari-mutuel gaming systems or computers within the pari-mutuel gaming system are configured to: process wagers; calculate and display odds, probables and payoff information; and the wagering terminals or other display elements of the pari-mutuel gaming system perform the functions of displaying the pari-mutuel gaming activity, selling and cashing betting tickets, and managing accounts set up by players.

As described herein, reference may be made to runners participating in a race and the results of completed races. As known in pari-mutuel wagering, wagers are also made on games of jai-alai and other competitive sporting events. Thus, as described herein, the reference to a runner in a race also includes a participant, such as a player or a team, in a game of jai-alai or other competitive sporting event and the reference to a "race" herein also encompasses a game of jai-alai or other competitive sporting event. In jai-alai, the participants score points, and the first participant to score a specified number of points wins. Thus, the jai-alai participants "race" to be the first participant to score the specified number of points, and participants are placed based on the number of points scored, in a manner similar to runners placing in a race.

The pari-mutuel gaming activities described herein may be implemented by configuring software and hardware of a pari-mutuel gaming system to display, present and offer the pari-mutuel gaming activities to patrons of pari-mutuel gaming establishments or to patrons participating in the pari-mutuel gaming activity on-line (i.e., over the Internet) or with a telephone-based wagering system. The gaming activities may be presented or displayed to the patrons, who will also be referred to herein as "players," at pari-mutuel gaming establishments with wagering terminals that include self-service terminals or teller operated terminals. The gaming activities may also be presented or displayed to players on computers through websites or through a telephone system with telephone menus. As used herein, the term "computer" will be used to refer to any device or network of devices having at least one central processing unit and that may be configured with software to conduct the pari-mutuel gaming activities described herein. Non-limiting examples of computers include personal computers, personal digital assistants, electronic wagering terminals, cell phones, and portable wagering terminals.

In one embodiment, the wagering terminals include a display element, such as a screen, for displaying information related to the pari-mutuel gaming activity to the player at the self-service terminal or to the teller at the teller operated terminal. The wagering terminals also include an input device that enables the player or the teller to input wagers made by the player. The input device may be a keypad or keyboard having keys or buttons, a touch-sensitive screen, an overlying touch-sensitive screen, a light pen, a mouse, a touchpad, a trackball, a voice recognition device or any other input device conventionally associated with electronic devices. Since the exemplary embodiments described herein may also be implemented on electronic interfaces in other media including telephones or on computers via the Internet, the term "display element" will also refer to computer monitors or other displays utilized by players that participate in the pari-mutuel gaming activities over the Internet or to a telephone receiver utilized by players that participate in the pari-mutuel gaming activities on a telephone system.

In one exemplary embodiment, a method of conducting a pari-mutuel gaming activity includes allowing a player to view an event that is the subject of the pari-mutuel gaming activity such as, for example, a race. In the method, a watcher of the race, such as a patron of a pari-mutuel gaming establishment or a patron connected to a pari-mutuel gaming system via a computer network or telephone network, is provided with an opportunity to "freeze" one or more images of the race using a "snapshot" function of a pari-mutuel gaming system of the present invention. Referring now to FIG. 1, there is illustrated a schematic diagram of one embodiment of a display element 10 and input device 14 that may be used to enable the patron to view the race and participate in the pari-mutuel gaming activity. The display element 10 is part of a pari-mutuel gaming system as described herein.

As depicted in FIG. 1, a main window 12 of the display element 10 is used to broadcast the race such that the patron may view the race in its entirety. The input device 14 is operatively connected to the pari-mutuel gaming system and enables the patron to "freeze" a selected image of the race displayed in the main window 12 by activating the input device 14. The input device 14 may comprise a mouse, a button, a keyboard, a portion of a touch-sensitive display element, a gaming terminal remote from the display element 10, a trackball or other conventional input device. Activation of the input device 14 causes software of the pari-mutuel gaming system or a computer configured with software to preserve an image, or "snapshot," or a plurality of images or snapshots, of one or more current view(s) in the main window 12 and activates the pari-mutuel gaming system or computer to save each "snapshot" as an image as indicated by one or more boxes 16*a*, 16*b* and 16*c*. Three separate images 16*a*-16*c* were obtained or "frozen" by the patron as indicated in FIG. 1.

By activating the input device 14, the patron is enabled to continue viewing the main window 12 of the "live" race in its entirety, while the "frozen" images, or "snapshots," 16*a*-16*c* may also be immediately or subsequently viewed by the patron while the patron continues viewing the "live" race in the main window 12 without "freezing" the image of the live race. Further, the patron is enabled to store and view icons of the multiple small, thumbnail images 16*a*-16*c* of the "frozen" views of the race created by the patron, wherein the patron may select these thumbnail images 16*a*-16*c* on the display element 10 for enlargement for closer inspection with the input device 14.

The ability to freeze various frames of a live, delayed or archived race video while allowing the patron to continue viewing the race in the main window 12 offers advantages over other viewing methods conventionally available.

For instance, the patron may exercise a degree of control over portions of the race on which the patron wishes to focus as compared to conventional race broadcasts, such as TV viewing. For example, the patron may wish to take "snapshots" of the start of the race to see whether his or her runner or runners started well or poorly. It is difficult to ascertain how the runners fared at the start of the race when the video in the main window 12 continues to stream and the action of the race continues to unfold. Thus, the snapshot feature allows the patron to view the "snapshots" of the beginning of the race and make these assessments at his or her leisure during or after the race.

In addition, the patron is able to continue to watch the race even though the patron has snapped and saved shots of the race in progress. This addresses the natural tendency of the patron to view the entire race as it unfolds in real time. Freezing the entire video, as conventionally offered by Internet replay sites, results in a frustrating delay in action for the patron, while the present invention enables the patron to obtain the "snapshots" while viewing the entire race in real time without halting and restarting the video.

The snapshot function further enables a patron to take multiple finish line photos customized to the patron's objective. This is especially useful for patrons who place wagers on multiple runners in exotic pools such as, for example, a superfecta wager. Unlike conventional photos that cover the winning runner and other runners that fit into the winning runner shot, the patron may take multiple finish line snapshots to understand where all the runners on which the patron wagered finished. This enables the patron to judge whether the placed wagers were winners, even before official results are posted. It is further contemplated that the patron may be enabled to preselect a series of snapshot images such as, for example, three images spaced in time to be taken with a single activation of the input device 14. For example, the patron may be able to preselect three snapshots, wherein each snapshot is taken at an interval of one-tenth (or one hundredth) of a second after the preceding snapshot is taken with a single activation of the input device 14.

Figure 2:
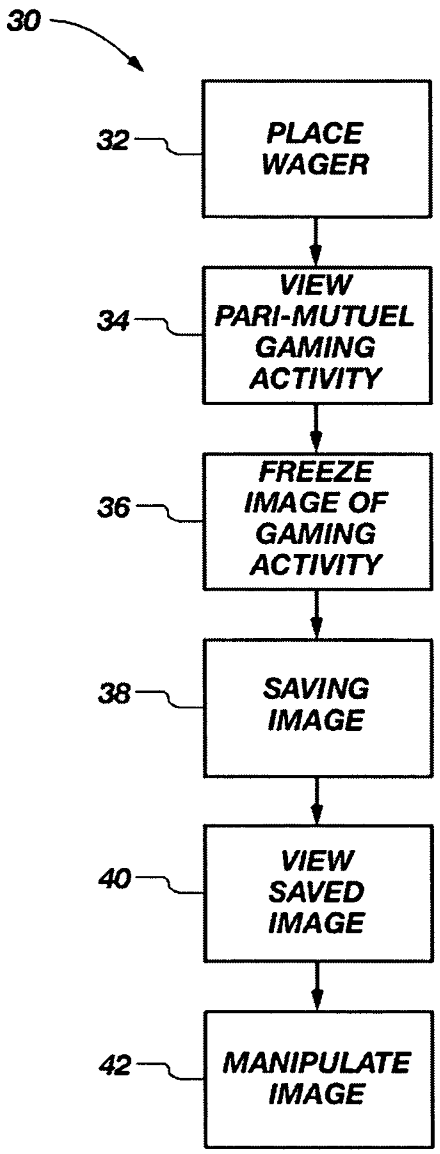
FIG. 2 is a flowchart depicting one embodiment of a method of conducting a pari-mutuel gaming activity of the present invention.

Referring now to FIG. 2, there is shown a flowchart for conducting one embodiment of the pari-mutuel gaming activity of the present invention generally indicated at 30. In the pari-mutuel gaming activity 30, the watcher, or patron, is provided with an opportunity to place at least one wager on the race or other event at box 32 and is also provided with an opportunity to view a race or other event at box 34. The patron is also provided with an opportunity to "freeze" at least one image of the race or other event at box 36 and responsive to the patron selecting to "freeze" the at least one image, the pari-mutuel gaming system or computer configured to conduct the pari-mutuel gaming activity 30 may save the at least one image at box 38. At box 40, the patron may view the saved image during the event or at a time after the event has concluded, and at box 42, the patron may manipulate the image such as, for example, by making one or more of the saved images larger, selecting a portion of one or more images for enlargement, superimposing one image or a portion thereof over another image, or other desired manipulation of the saved image.

Figure 3:
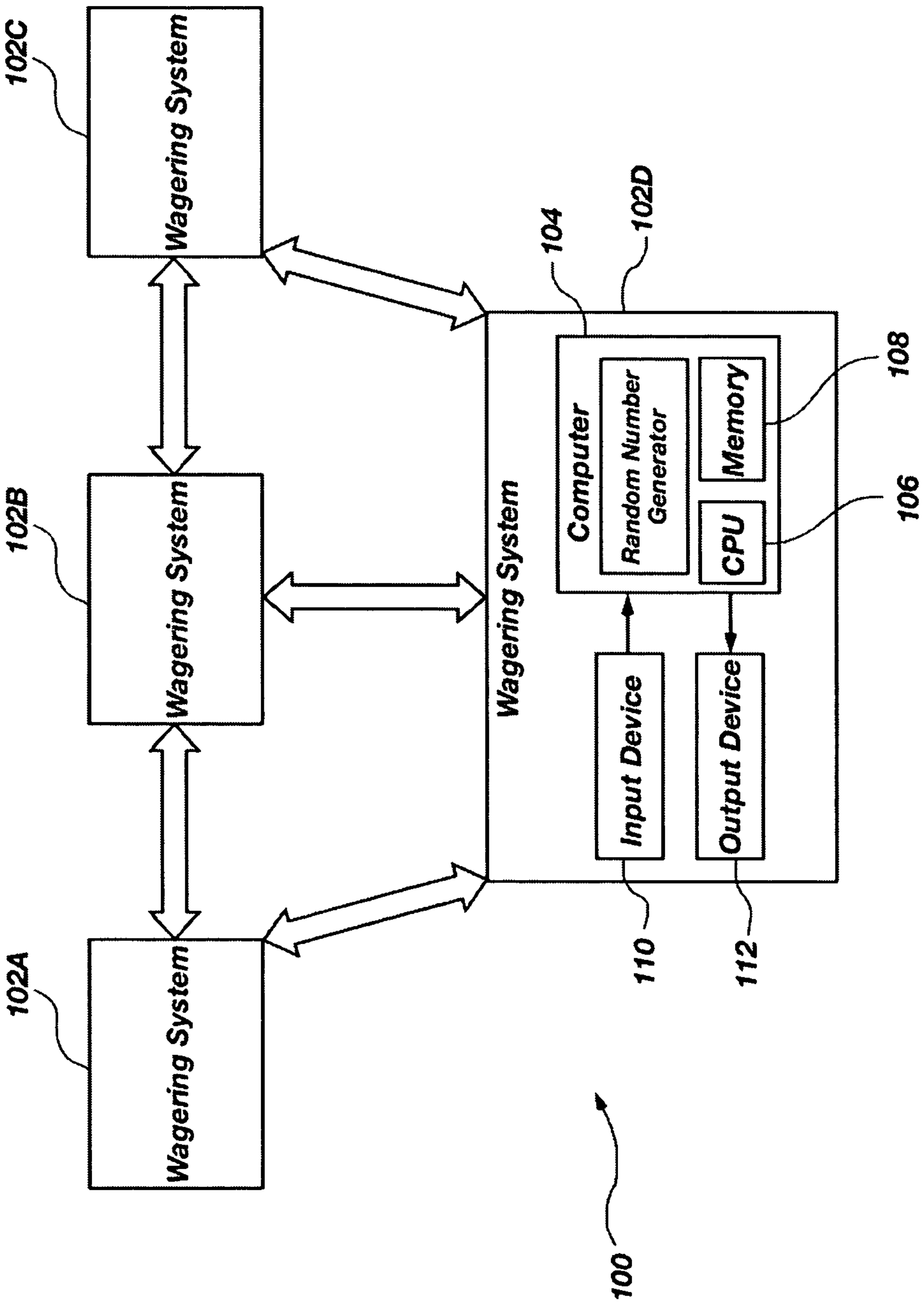
FIG. 3 is a schematic diagram of one embodiment of a wagering system and network that may be used in accordance with the pari-mutuel gaming activities described herein.

Referring now to FIG. 3, one embodiment of a network 100 for conducting the pari-mutuel gaming activities described herein is illustrated. The network 100 may comprise a local area network (LAN), a wide area network (WAN) or a combination thereof and may include a plurality of pari-mutuel wagering systems 102A-102D which are operably coupled to one another and, optionally, to a server. Each wagering system 102 may include, for example, a computer 104 with a central processing unit (CPU) 106 or other processing device and associated memory 108. Each computer 104 may be configured with software that enables the computer 104 to conduct the pari-mutuel gaming activities as described herein. The computer 104 may comprise a personal computer, a personal digital assistant, a wagering terminal, a portable wagering terminal, a cell phone, or other electronic device capable of running software configured to conduct the pari-mutuel gaming activities described herein. Alternatively, pari-mutuel wagering systems 102A-102D may comprise a network 100 of "dumb" terminals comprising at least one input device and a display device and, optionally, one or more output devices such as a ticket printer or a player or credit/debit card interface (which may, of course, be employed as both an input and an output device).

An input device 110, such as the input device 14 of FIG. 1, may be operatively coupled with the computer 104 to interact with patrons and receive selections of the patrons. The input device 110 may further include a device for accepting a monetary value associated with a pari-mutuel wager, wherein the device for accepting the monetary value may include, for example, a coin collector, a bill collector or a card reader. An output device 112 may also be coupled with the computer 104 and configured, for example, to display an event that is the subject of pari-mutuel gaming activities described herein such as the display element 10 of FIG. 1. Such an output device 112 may include, for example, a visual touch-sensitive display or a printing device. Additionally, such an output device 112 may be configured to display the results of a pari-mutuel gaming activity taking place at a remote venue. For example, a first pari-mutuel wagering system 102A may be located at a first venue while another pari-mutuel wagering system 102D may be located at a second remotely located venue. Thus, the network 100 comprising the plurality of pari-mutuel gaming systems 102A-102D may enable wagering on, and monitoring of, pari-mutuel gaming activities by patrons at multiple venues substantially simultaneously if so desired.

In another embodiment, the pari-mutuel wagering systems 102A-102D may be located at a single venue where, for example, a first pari-mutuel wagering system 102A acts as a server while other pari-mutuel wagering systems 102B-102D act as terminals coupled with the server 102A.

In a further embodiment, a person wishing to participate in a pari-mutuel gaming activity may purchase or download software onto their personal computer or personal digital assistant such that the person is enabled to operatively connect to a pari-mutuel gaming system over a computer network such as, for example, the Internet. In this embodiment, the downloaded software may be configured to generate information associated with a pari-mutuel gaming activity conducted by the pari-mutuel gaming system, display the information on a display element associated with the computer, and provide the person with an opportunity to save a "snapshot" of a race conducted by the pari-mutuel gaming system as described herein. The software may be further configured to enable the computer to provide the person with an opportunity to place a wager on the race such as by accepting credit or debit card information from the person or allowing the person to set up a player account with the pari-mutuel gaming system.

The exemplary embodiments described herein are not intended to limit the invention or the scope of the appended claims. Various combinations and modifications of the embodiments described herein may be made without departing from the scope of the present invention and all modifications are meant to be included within the scope of the present invention. For instance, the various embodiments of the pari-mutuel gaming activities described herein may be used in conjunction with other conventional pari-mutuel gaming activities. Further, the pari-mutuel gaming activities described herein may be implemented by appropriately configuring software or hardware systems of pari-mutuel gaming systems and used in conjunction with existing pari-mutuel gaming systems, and may be implemented for on-line gaming over the Internet. Thus, while certain exemplary embodiments and details have been described for purposes of exemplifying the invention, it will be apparent to those of ordinary skill in the art that various changes to the invention described herein may be made without departing from the scope of the present invention, which is defined in the appended claims.

What is claimed is:

1. A method of conducting a pari-mutuel gaming activity, the method comprising:

providing at least one patron an opportunity to view an event which is a subject of the pari-mutuel gaming activity on a display element;

providing the at least one patron an opportunity to freeze at least one image of the event in progress while enabling the patron to continue viewing the event in progress;

solely responsive to the at least one patron freezing the at least one image, saving the at least one image and displaying the at least one image as a thumbnail image on the display element in conjunction with the event in progress;

providing the at least one patron an opportunity to freeze at least another image of the event in progress while enabling the patron to continue viewing the event in progress on the display element;

solely responsive to the at least one patron freezing the at least another image, saving the at least another image and displaying the at least another image as a thumbnail image on the display element in conjunction with the event in progress and the thumbnail image of the at least one image; and providing the at least one patron an opportunity to view the at least one saved image and the at least another saved image on the display element subsequent to saving.

2. The method according to claim 1, wherein providing the at least one patron an opportunity to view the at least one saved image and the at least another saved image on the display element subsequent to saving comprises providing the at least one patron an opportunity to view the at least one saved image and the at least another saved image at a conclusion of the event in progress.

3. The method according to claim 1, further comprising providing the at least one patron an opportunity to place a wager on the event.

4. The method according to claim 1, further comprising providing the at least one patron an opportunity to manipulate the at least one saved image and the at least another saved image.

5. The method according to claim 4, wherein providing the at least one patron an opportunity to manipulate the at least one saved image and the at least another saved image comprises superimposing the at least one saved image over the at least another saved image.

6. The method according to claim 1, wherein providing the at least one patron an opportunity to freeze at least one image of the event in progress comprises:

providing the at least one patron an opportunity to preselect a time interval between a first image and a second image; and responsive to the at least one patron freezing the first image, freezing the second image after the preselected time interval.

7. The method according to claim 1, wherein providing the at least one patron an opportunity to view the at least one saved image and the at least another saved image on the display element subsequent to saving comprises:

providing the at least one patron an opportunity to select at least one of the thumbnail image of the at least one image and the thumbnail image of the at least another image; and responsive to the at least one patron selecting the at least one of the thumbnail image of the at least one image and the thumbnail image of the at least another image, enlarging the selected at least one of the thumbnail image of the at least one image and the thumbnail image of the at least another image on the display element.

8. The method according to claim 1, wherein providing the at least one patron the opportunity to freeze the at least one image comprises connecting an input device to a pari-mutuel gaming system, such that activation of the input device causes the pari-mutuel gaming system to save the at least one image and the at least another image.

9. A method of conducting a pari-mutuel gaming activity, the method comprising:

providing at least one patron an opportunity to view an event which is a subject of the pari-mutuel gaming activity on a display element associated with a pari-mutuel gaming system;

providing the at least one patron an opportunity to freeze at least one image of the event while in progress with an input device while enabling the patron to continue viewing the event in progress on the display element;

automatically activating the pari-mutuel gaming system to save and display the at least one image on the display element directly responsive to the at least one patron freezing the at least one image;

providing the at least one patron an opportunity to freeze at least another image of the event while in progress with the input device while enabling the patron to continue viewing the event in progress on the display element;

automatically activating the pari-mutuel gaming system to save and display the at least another image on the display element directly responsive to the at least one patron freezing the at least another image; and providing the at least one patron an opportunity to view the at least one saved image and the at least another saved image on the display element subsequent to saving.

10. The method according to claim 9, further comprising providing the at least one patron an opportunity to place a wager on the event.

11. The method according to claim 9, further comprising providing the at least one patron an opportunity to manipulate the at least one saved image and the at least another saved image with the input device.

12. The method according to claim 9, wherein providing the at least one patron the opportunity to freeze the at least one image comprises providing the at least one patron with an opportunity to freeze a plurality of images.

13. The method according to claim 9, further comprising displaying the at least one saved image and the at least another saved image on the display element below the event.

14. The method according to claim 9, further comprising displaying a thumbnail image of the at least one saved image and the at least another saved image on the display element.

15. A system for conducting a pari-mutuel gaming activity, the system comprising:

a display element for displaying information associated with an event which is a subject of the pari-mutuel gaming activity;

an input device for interacting with at least one patron; and a computer operatively configured with software;

wherein the software is operatively configured to enable the computer to conduct the pari-mutuel gaming activity, wherein, in the pari-mutuel gaming activity:

the display element is enabled to display the event in progress;

the at least one patron is provided with an opportunity to freeze at least one image of the event in progress with the input device while enabling the patron to continue viewing the event in progress on the display element;

wherein, if the at least one patron freezes the at least one image, the at least one image is automatically saved in memory and displayed as a thumbnail image on the display element in conjunction with the event in progress;

the at least one patron is provided with an opportunity to freeze at least another image of the event in progress with the input device while enabling the patron to continue viewing the event in progress on the display element;

wherein, if the at least one patron freezes the at least another image, the at least another image is automatically saved in memory and displayed as a thumbnail image on the display element in conjunction with the event in progress and the thumbnail image of the at least one image; and the at least one patron is provided with an opportunity to view the at least one saved image and the at least another saved image on the display element.

16. The system of claim 15, wherein the software is further configured to enable the computer to provide the at least one patron with an opportunity to place a wager on the event.

17. The system of claim 15, wherein the software is further configured to enable the computer to provide the at least one patron an opportunity to manipulate the at least one saved image and the at least another saved image.

18. The system of claim 15, wherein the software is further configured to enable the patron to view at least one of the at least one saved image and the at least another saved image during the event or after the event has concluded by selecting the thumbnail image of the at least one saved image or the thumbnail image of the at least another saved image.

19. The system of claim 15, wherein the software is further configured to enable the patron to preselect a time interval between the at least one image and the at least another image and responsive to the at least one patron freezing the at least one image, the software freezes the at least another image after the preselected time interval.

20. The system of claim 15, wherein the input device comprises at least one of a keypad, a keyboard, a touch-sensitive screen, an overlying touch-sensitive screen, a light pen, a mouse, a touch pad, a trackball, or a voice recognition system.

21. The system of claim 15, wherein the display element comprises a touch-sensitive screen and the input device comprises a portion of the touch-sensitive screen.

22. The system of claim 15, wherein the computer is operatively connected to a computer network.

23. The system of claim 22, wherein the computer network comprises the Internet.

24. The system of claim 15, further comprising a plurality of display elements.

25. The system of claim 15, further comprising a device for accepting monetary value.

26. The system of claim 15, further comprising an output device.

27. A computer configured to conduct a pari-mutuel gaming activity, comprising:

a central processing unit;

an input device; and memory operatively configured with software;

wherein the software is operatively configured to:

display an event which is a subject of the pari-mutuel gaming activity on a display element;

generate information associated with the event of the pari-mutuel gaming activity;

display the information associated with the event of the pari-mutuel gaming activity on the display element;

automatically store at least one image of the event in the memory in direct response to at least one patron activating the input device while continuing to display the event of the pari-mutuel gaming activity on the display element;

automatically store at least another image of the event in the memory in direct response to the at least one patron activating the input device while continuing to display the event of the pari-mutuel gaming activity on the display element; and allow the at least one patron to view the at least one stored image and the at least another stored image on the display element.

28. The computer of claim 27, wherein the software is further configured to enable the computer to provide the at least one patron with an opportunity to place a wager on the event.

29. The computer of claim 27, wherein the software is further configured to enable the computer to provide the at least one patron an opportunity to manipulate the at least one saved image and the at least another saved image with the input device.

30. The computer of claim 27, where the software is further configured to enable the patron to view the at least one saved image and the at least another saved image during the event or after the event has concluded.

31. The computer of claim 27, wherein the input device comprises at least one of a keypad, a keyboard, a touch-sensitive screen, an overlying touch-sensitive screen, a light pen, a mouse, a touch pad, a trackball, or a voice recognition system.

32. The computer of claim 28, wherein the memory is further configured with software that enables the computer to connect to the Internet.

33. The computer of claim 27, wherein the software is further configured to display an icon of the at least one image, an icon of the at least another image, and the event of the pari-mutuel gaming activity in its entirety on the display element.

34. The computer of claim 33, wherein the software is further configured to enlarge at least one of the icon of the at least one image and the icon of the at least another image in response to the at least one patron selecting the at least one of the icon of the at least one image and the icon of the at least another image with the input device.

* * * * *